June 23, 1942.  F. E. ARNDT  2,287,080
SPREADER
Original Filed Nov. 5, 1937  3 Sheets-Sheet 1

INVENTOR:
FRANKLIN E. ARNDT,
BY
Chas. M. Nissen,
ATTY.

June 23, 1942.　　　F. E. ARNDT　　　2,287,080
SPREADER
Original Filed Nov. 5, 1937　　　3 Sheets-Sheet 2
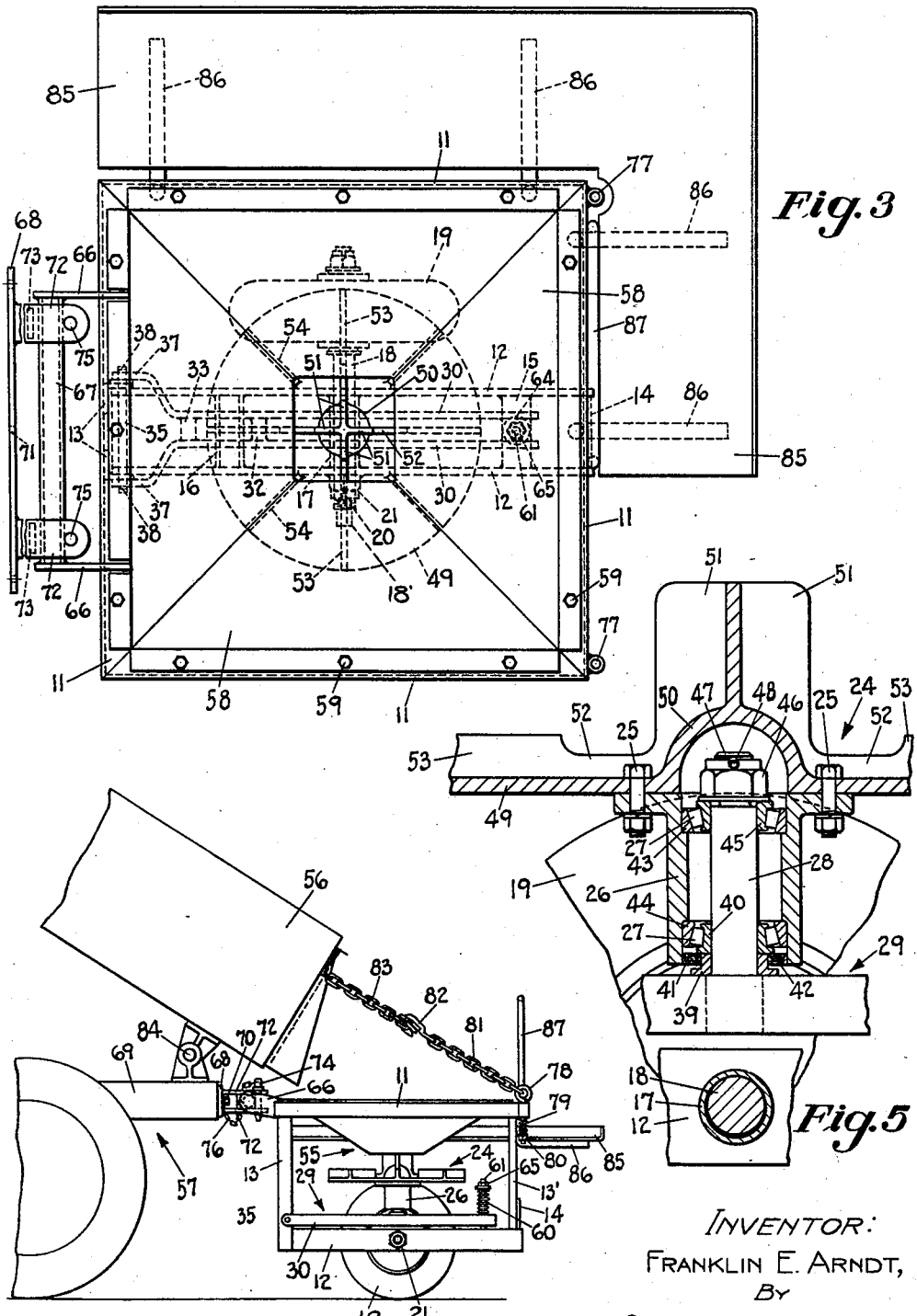

June 23, 1942.                F. E. ARNDT                 2,287,080
                                SPREADER
             Original Filed Nov. 5, 1937        3 Sheets-Sheet 3
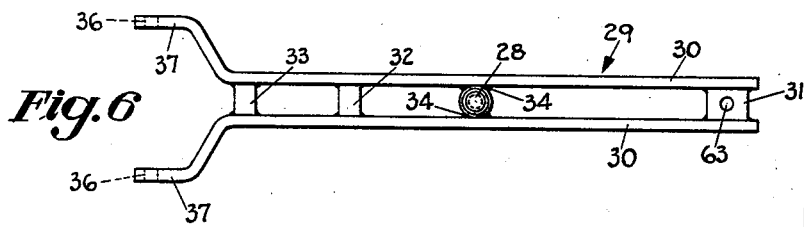
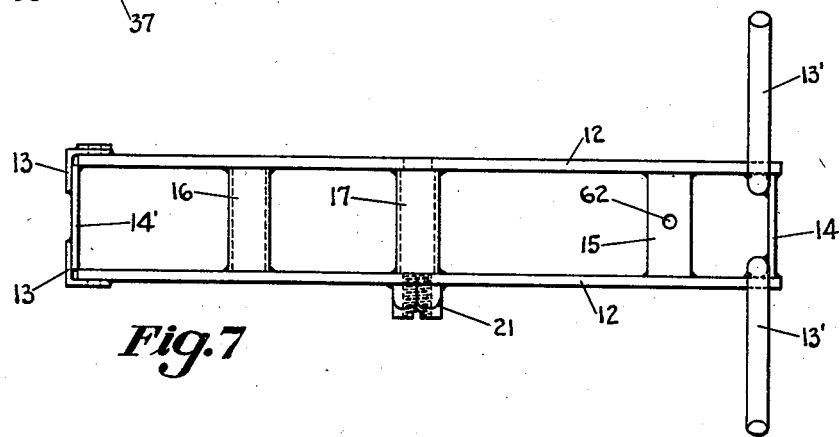
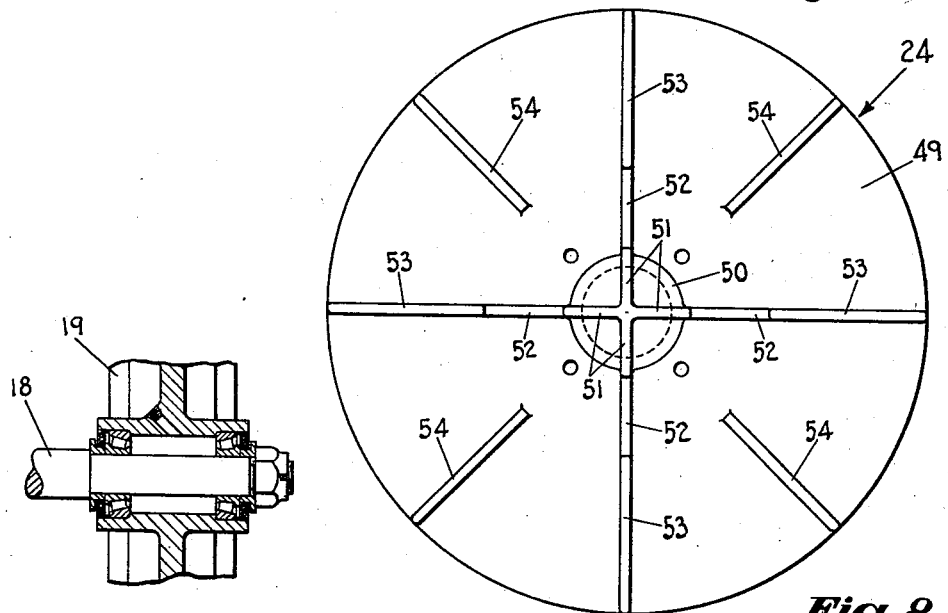
INVENTOR:
FRANKLIN E. ARNDT,
BY
Chas. M. Nissen,
ATTY.

Patented June 23, 1942

2,287,080

UNITED STATES PATENT OFFICE 2,287,080

SPREADER

Franklin E. Arndt, Galion, Ohio, assignor to The Galion Iron Works & Manufacturing Company, a corporation of Ohio Original application November 5, 1937, Serial No. 173,000, now Patent No. 2,243,939, dated June 3, 1941. Divided and this application July 22, 1939, Serial No. 285,935

3 Claims. (Cl. 275—8)

My invention relates to spreading apparatus adapted to be hitched to and towed behind a self-propelled dumping truck, and one of the objects of the invention is to improve and simplify a spreader of this type to reduce the cost of construction to a minimum.

Another object of the invention is the provision of improved and efficient mechanism for yieldingly holding a rotary spreading device in frictional engagement with the ground engaging supporting wheel.

Other objects of the invention will appear hereinafter, the novel features and combinations being set forth in the appended claims.

This application is a division of my co-pending application, Serial No. 173,000, filed November 5, 1937, now Patent No. 2,243,939, granted June 3, 1941, for an improvement in Spreaders.

In the accompanying drawings,

Fig. 3 is a plan view of the spreader shown in Fig. 1;

Fig. 4 is a side elevational view of the spreader operatively connected to a self-propelled dumping truck having a tilting body adapted to be connected to the spreader so that when the forward end of the tilting body is lowered the spreader will be lifted up off the ground and supported for transportation;

Fig. 5 is an enlarged vertical sectional view showing in detail the mounting of the distributing disc;

Fig. 6 is a plan view of the auxiliary frame which supports the spreader disc;

Fig. 7 is a sectional plan view of the lower portion of the main frame;

Fig. 8 is a plan view of the spreader disc including its radial fins; and

Fig. 9 is a sectional view of the ground engaging driving wheel journaled to the axle which is stationary relative to the supporting frame.

Figure 1:
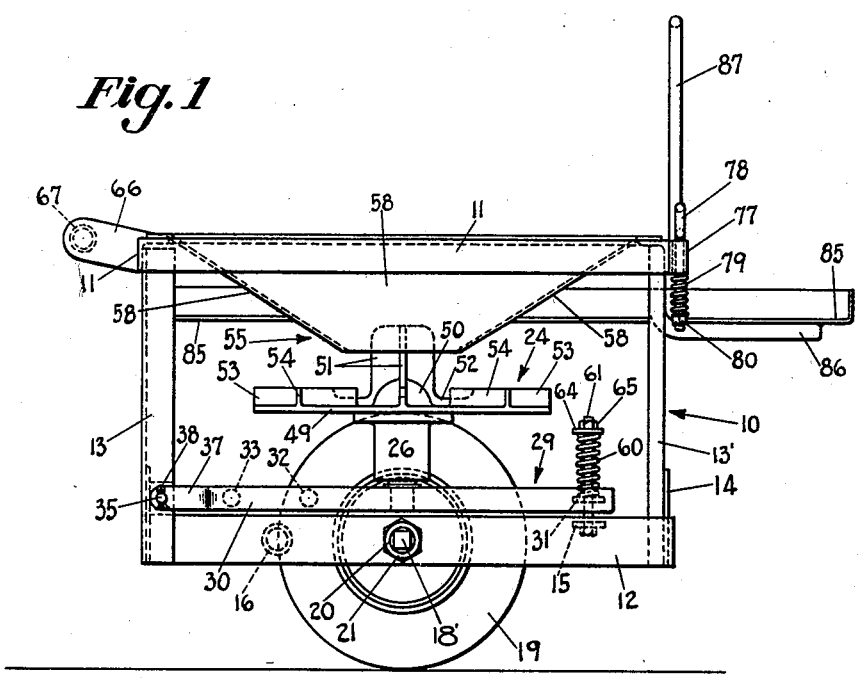
Fig. 1 is a side elevational view of a spreader embodying my invention.

Referring to the accompanying drawings, the spreader embodying my invention, comprises a supporting frame 10 having top angle iron members 11, bottom plate members 12, and upright angle iron members 13, 13 and diagonal braces 13', 13', all of which are rigidly connected together, preferably by welding.

While the top of the supporting frame is shown square in outline in Fig. 3, the bottom plate members 12 are shown in dotted lines in Fig. 3, spaced apart only a short distance, and consequently the uprights 13, 13' at the ends of the plates 12 are correspondingly spaced apart only a short distance and the upper and lower ends of such uprights rigidly connected to the square top 11 and rectangular bottom 12 of the frame 10.

A vertical reinforcing plate 14, a horizontal spacing plate 15 and a reinforcing pipe 16 connect the spaced-apart vertical plates 12, as shown in Figs. 1, 3 and 7. An additional reinforcing pipe 17 also connects the spaced plates 12, as shown in Fig. 7. The reinforcements 14, 15, 16 and 17 are preferably welded at their ends to the plates 12, 12. A cross-plate 14' is welded to the left-hand ends of the spaced plates 12, as viewed in Fig. 7. The lower ends of the uprights 13, 13 may be welded to the cross-plate 14'.

Figure 2:
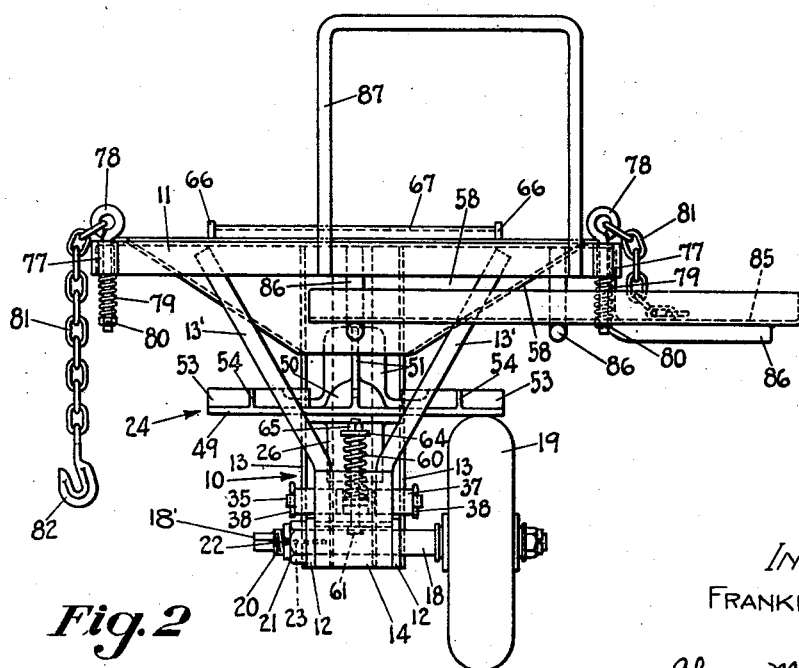
Fig. 2 is a rear end elevational view of the spreader shown in Fig. 1.

The reinforcing pipe or tubular connection 17 between the bottom plates or bars 12, 12 serves also to receive and support the axle 18 on the right-hand end of which is journaled the ground engaging wheel 19. That end of the axle 18 remote from the wheel 19 is screw-threaded at 20 through a nut 21 which is welded to the left-hand plate or bar 12, as viewed in Fig. 2. This plate with the nut 21 welded thereto is shown more clearly in Fig. 7. The axle 18 may be locked in adjusted position relative to the plates or bars 12 by means of a cotter pin 22 fitting in notches of the nut 21 and extending through one of the series of transverse perforations 23 in the axle 18, as shown in Fig. 2. When the cotter pin 22 is removed, the axle 18 may be rotated so that its screw-threaded portion 20 may be threaded through the fixed nut 21 and thereby adjust the position of the ground-engaging wheel relative to the frame and relative to a spreder disc 24 for a purpose hereinafter more fully explained. The axle 18 may be rotated by applying a socket wrench to the squared end 18'.

The disc 24 is detachably mounted by means of the bolts 25, 25 on the hub 26 which is journaled by means of the thrust bearings 27, 27 on the upright bearing shaft 28 which is secured at its lower end, preferably by welding, to the auxiliary pivoted frame 29.

The auxiliary frame 29, as shown in Fig. 6, comprises spaced-apart parallel plates 30, 30 rigidly connected by the spacers 31, 32 and 33. Intermediate the spacers 31 and 32 the enlarged lower end of the upright bearing shaft 28 is welded to the spaced-apart plates or bars 30, 30, as shown at 34 in Fig. 6.

The left-hand end of the auxiliary frame 29 as viewed in Fig. 6 shows the bars 30, 30 spaced-apart or diverging a distance sufficient to embrace the outer sides of the vertical angle irons 13, 13. A pivot pin 35 is adapted to extend through openings 36, 36 in the arms 37, 37 of the auxiliary frame 29. The pivot pin 35 also extends through perforations in the vertical angle iron members 13, 13 a short distance above the plates 12, 12 as shown in Fig. 1. Cotter pins 38 at the ends of the pivot pin 35 retain the latter in fixed relation to the main and auxiliary frames, as shown in Figs. 1 and 3.

It should be particularly noted that the spreader disc 24 is carried by the auxiliary frame 29 and moves up and down bodily therewith. Mounted on the auxiliary frame and fixed to the bearing shaft 28 is a collar 39, and fixed to the bearing shaft 28 on top of the collar 39 is the lower roller bearing 40. A lubricant seal surrounding the collar 39 comprises a metal cup 41 secured to the inner lower end of the hub 26 and supporting a felt washer 42.

The bearing members 43, 44 fit against reverse shoulders on the inner side of the hub 26, as shown in Fig. 5. The upper bearing member 45 is slidable vertically on the bearing shaft 28 so that by means of the nut 46 on the upper screw-threaded end 47 of the bearing shaft 28 the spaced-apart thrust bearings may be taken up and the nut 46 then locked in adjusted position by means of the cotter pin 48.

By referring to Fig. 5 it will be seen that the bearing 40 is seated on the collar 39 and the latter in turn is seated on the support or auxiliary frame 29. When the cotter pin 48 is removed the nut 46 may be tightened to force the washer, beneath the same, against the bearing member 45 to slide the latter down along the shaft 28 to take up wear of the rollers or bearings. Upon the cotter pin being replaced after making such adjustment the adjusting mechanism co-acts with the spaced thrust bearings and the hub to confine the distributor plate against movement axially of the shaft 28 altho the distributor plate is always free to rotate. Consequently the spring 60 (Fig. 1) may act through the auxiliary frame 29 to constantly pull the bottom of the distributor plate against the periphery of the ground engaging wheel. In other words, the assembly is such that the confining mechanism within the hub compels the frame 29 and the parts carried thereby to move up and down as a unit, thereby permitting the distributor plate to yield to the irregularities of the periphery of the ground engaging wheel 19.

The spreader disc structure is shown in Figs. 5 and 8 and comprises a plate 49 which is flat or plane on its underside and has radial fins integral therewith on its upper side. The center of the plate 49 is dome-shaped at 50, as shown in Fig. 5, so as to provide ample space for the upper end of the bearing shaft 28 and the nut 46 thereon. By removing the bolts 25 the spreader disc may be detached from the hub 26 for the purpose of introducing lubricant in the chamber containing the thrust bearings shown in Fig. 5.

Projecting upwardly from the dome 50 are upwardly elongated fins 51, 51, radially disposed 90 degrees apart. Radiating from the lower ends of the fins 51 on the top of the plate 49 are fins 52, 52 of relatively shallow depth. The shallow radial fins 52 are extended by the radial fins 53, 53 of greater depth, to the outer circular edge of the plate 49, as shown in Fig. 8. Intermediate the radial fins 53, 53 are additional radial fins 54, 54 of approximately the same lengths as the radial fins 53, 53. All of the radial fins 53 and 54 extend above the plate 49 the same distance. The inner ends of the radial fins 54 are spaced from the dome 50 while the inner ends of the radial fins 53 are connected to the center of the dome 50 by means of the shallow fins 52 and the upper elongated fins 51, as shown in Figs. 5 and 8.

The upwardly elongated fins 51 of the spreader disc 24 are adapted to extend upwardly through the open bottom of the hopper 55, the upper side of which is also open to receive the material dumped from the tilting body 56 of a self-propelled dumping truck 57, as illustrated in Fig. 4.

The hopper 55 may be composed of flat plates 58, 58 with their upper edges bent into position for securing by means of the bolts 59, 59 to the tops of the angle iron frame members 11, 11, as shown in Fig. 3. The hopper is therefore in the form of an inverted truncated pyramid with the edges of the open bottom located above the shallow radial fins 52, 52, as shown in Fig. 2. The outer ends of the radial fins 51 are spaced from the edges of the bottom opening of the hopper, and ample space is provided, as shown in Fig. 3, for free flow of the material from the hopper 55 to the top of the rotary spreader disc 24. By reason of the upward projection of the fins 51 into the lower portion of the hopper 55, a stirring action is afforded on the material at the lower portion of the hopper so that any tendency of discontinuance of flow of material from the hopper will be avoided. Furthermore, such stirring action will produce a more uniform flow of the material so as to be in accordance with the speed of travel of the towing vehicle to which the spreader is connected.

By referring to Fig. 3 it will be seen that the fins 51 where they project upwardly into the discharge opening in the bottom of the hopper, take up a relatively small amount of space. In other words, the area of the discharge opening is decreased but little because the agitator is composed of radial fins. Moreover, while the large area of the discharge opening is maintained notwithstanding the presence of the agitator, the upstanding radial fins 51 have a radial throwing action which becomes effective as soon as the material leaves the discharge opening in the bottom of the hopper, in starting the spreading of the discharged material. It will thus be seen that the fins 51 act as spreading fins as soon as the material is discharged from the hopper and even before such discharged material reaches the top of the spreader disc.

As shown in Fig. 9, the ground engaging wheel 19 is journaled to the right-hand end of the axle 18, as shown in Fig. 2, in such a manner that when the axle 18 is adjusted relative to the plates or bars 12, the periphery of the rubber-tired wheel 19 will frictionally engage the flat bottom of the spreader disc 24 at an adjusted distance from its center of rotation. It will thus be seen that when the axle 18 is adjusted axially relative to its support, the speed of rotation of the spreader disc 24 may be varied. Whenever the speed of rotation of the spreader disc 24 is varied, the speed of rotation of the stirring and throwing fins 51 is likewise adjusted. The nearer to the center of the spreader disc 24 the ground engaging driving wheel 19 is adjusted, the faster the disc will be rotated and the greater the area will be over which the material is spread. The increase of rotation of the disc will also effect increased rotation of the stirring action by means of the fins 51, and consequently the faster the material can flow from the hopper. The spreader disc may be made of metal, such as iron, or other material, and its lower flat side may have attached thereto a layer of friction material, but I prefer the rubber-tired ground engaging driving wheel 19 frictionally engaging the lower flat metal side of the rotary spreader disc 24.

In order to hold the lower flat side of the rotary disc 24 yieldingly against the periphery of the rubber-tired ground engaging driving wheel 19, a compression spring 60 is mounted at that end of the auxiliary frame 29 remote from the pivot 35 so as to urge the auxiliary frame 29 down toward the reinforcing plate 15 which connects the plates 12. The spring 60 surrounds a bolt 61 the lower end of which extends through an opening 62 in the spacer 15 between the plates 12. Above the spacer 15 the bolt extends through an opening 63 in the spacer 31 between the plates 30. The upper end of the bolt 61 extends through a washer 64 on top of which is a nut 65, by means of which the tension in the spring may be adjusted. Inasmuch as the spring 60 urges the right-hand end of the auxiliary frame 29, as viewed in Fig. 1, in a downward direction, the bearing shaft 28 and nut 46 shown in Fig. 5, transmit this downward force to the spreader disc so as to hold the latter yieldingly against the periphery of the ground engaging driving wheel 19. Any irregular periphery of the wheel 19, such as that caused by road material clinging thereto, will not interfere with maintenance of frictional engagement between the periphery of the wheel and the bottom of the spreader disc.

There is of course inherent in the construction disclosed, a floating action of the disc 24 on the periphery of the wheel 19 by reason of the weight of the disc and the parts moving up and down bodily therewith. But I prefer not to omit the spring 60 because the inclusion of the spring is more effective in keeping the bottom of the disc 24 in frictional driving engagement with the periphery of the wheel 19 and the spring mounting acts to limit the upward bouncing of the disc and therefore keeps the upper ends of the fins 51 centralized in the hopper discharge opening.

The hitching mechanism for connecting the spreader to a self-propelled dumping truck is shown in Figs. 3 and 4 and comprises a drawbar structure composed of spaced-apart vertical plates 66, 66 rigidly connected to the forward upper edge of the main frame, with the forward ends of the plates 66 rigidly connected together by means of the pipe 67. The supporting plate 68 may be connected to the rear end of the frame 69 by means of the lag screws 70 extending through the perforations 71 in the plate 68. Extending rearwardly from the plate 68 are two pairs of vertically spaced horizontal bracket plates 72, 72 connected by vertical spacer plates 73, 73 which serve to act as abutments for the front side of the pipe 67 when the latter is located between the bracket plates 72, 72, as shown in Figs. 3 and 4. The drawbar plates 66, 66 are preferably located outside of the bracket plates 72, as shown in Fig. 3. Coupling pins 74 are adapted to be inserted through the vertically aligned openings 75, 75 in the spaced-apart bracket plates 72, 72. The coupling pins may be connected by means of chains 76 to the truck frame plate 68.

At the rear of the top edge of the spreader and at the corners thereof are located spaced-apart sockets 77, 77 for receiving the screw eyes 78, 78 which project downwardly a sufficient distance for receiving the compression springs 79, 79 between the nuts 80, 80 and the bottom of the rear top frame member 11, as shown in Fig. 2. By means of the nuts 80 the tension of the springs 79 may be adjusted and the nuts then locked in adjusted positions to the screw eyes 78.

Chains 81, 81 are connected to the screw eyes 78, 78 and provided at their ends with hooks 82 which are adapted to be connected to the chains 83 mounted on the rear end of the truck body 56, as shown in Fig. 4. The chains 83 are spaced apart a distance equal to the spacing of the sockets 77, 77. It can readily be seen by referring to Fig. 4 that when the forward end of the truck body 56 tilts downwardly on its pivot 84, the chains 81, 83 will effect lifting of the driving wheel 19 from the ground. The springs 79 will act as shock absorbers both when the spreader is lifted from the roadway and during transportation of the spreader while up off the roadway.

During operation the chains 81 and 83 are disconnected. The truck body 56 is tilted to such an angle as to regulate the flow of material therefrom into the hopper 55, and to facilitate the flow of material from the truck body 56 an attendant may use a raking tool while he stands on the platform 85 which is secured by means of the brackets 86, 86 to one side and a portion of the rear of the main frame. It is preferred to locate the platform 85 at that side of the main frame, toward which the wheel 19 is offset, as shown in Fig. 3. An inverted U-shaped rod 87 is secured at its ends to the rear top edge of the main frame, and the upper horizontal portion of such rod may be used as a rail to be grasped by such attendant with one hand while he operates the rake with the other hand.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A material distributor assembly comprising a support, an upstanding shaft secured to said support, a rotary distributor, a hub detachably secured to the central portion of the underside of said distributor, spaced-apart thrust bearings within said hub for journaling the latter to said shaft, the underside of said rotary distributor being adapted to be in frictional driving engagement with the periphery of a ground engaging wheel, and means accessible upon detaching said distributor from said hub for adjusting said thrust bearings to confine said hub against movement axially of the shaft during up and down movements of the distributor together with said shaft and said support while said distributor is being driven by said ground engaging wheel.

2. A material spreader assembly comprising a frame, a bearing shaft fixed to said frame, a rotary distributor adapted to have its underside in frictional driving engagement with the periphery of a ground engaging wheel, a hub secured to said distributor, reverse annular shoulders spaced apart in said hub, roller bearings seated against such shoulders, spaced roller bearings on said shaft, rollers between the bearings on the seats and the bearings on the shaft, a support for one of the bearings on said shaft, and means engaging the other bearing on said shaft for taking up wear in the bearings and for confining said hub against movement axially of said shaft while said distributor and hub are free to rotate relatively to said frame and the whole assembly is free to move up and down bodily while the distributor is being driven by said ground engaging wheel.

3. A material spreader assembly comprising a rotary distributor, a hub secured thereto, a support, a bearing shaft projecting upwardly from said support, an upwardly facing annular shoulder at the upper inner end portion of said hub, a roller thrust bearing associated with said shoulder, means at the upper end of said bearing shaft for holding said roller bearing in association with said annular shoulder, and means adapted to mount said support for up and down movement relatively to a frame supported by a ground engaging wheel with the periphery of the latter in frictional driving engagement with the underside of said rotary distributor, the construction and arrangement being such that when the support descends relatively to said frame the said shaft exerts a pull through said roller thrust bearing against said annular shoulder to press the bottom of said distributor against the periphery of said ground engaging wheel and that when foreign material on such periphery lifts said distributor the latter exerts an upward pull on said shaft through said annular shoulder and the said roller thrust bearing associated therewith.

FRANKLIN E. ARNDT.